(12) United States Patent
Kilkki

(10) Patent No.: US 6,490,287 B1
(45) Date of Patent: Dec. 3, 2002

(54) USE ALLOWED PRIORITY LEVEL FOR ROUTING DECISION IN SIMA NETWORKS

(75) Inventor: Kalevi Kilkki, Lexington, MA (US)

(73) Assignee: Nokia Telecommunications Oy (FI)

( * ) Notice: Subject to any disclaimer, the term of this patent is extended or adjusted under 35 U.S.C. 154(b) by 0 days.

(21) Appl. No.: 09/146,862

(22) Filed: Sep. 3, 1998

(51) Int. Cl.$^7$ .............................................. H04L 12/56
(52) U.S. Cl. ............................ 370/395.42; 370/395.21
(58) Field of Search ................................. 370/230, 238, 370/253, 351, 400, 401, 389, 395.42, 395.21

(56) References Cited

U.S. PATENT DOCUMENTS

| | | | |
|---|---|---|---|
| 5,099,235 A | | 3/1992 | Crookshanks |
| 6,011,778 A | * | 1/2000 | Kilkki et al. ................. 378/232 |
| 6,041,039 A | * | 3/2000 | Kilkki et al. ................. 370/230 |
| 6,047,326 A | * | 4/2000 | Kilkki ........................... 709/228 |
| 6,081,505 A | * | 6/2000 | Kilkki ........................... 370/230 |
| 6,081,843 A | * | 6/2000 | Kilkki et al. ................. 709/232 |

FOREIGN PATENT DOCUMENTS

| | | |
|---|---|---|
| DE | 44 41 356 A1 | 1/1995 |
| EP | 753 979 A | 1/1997 |

OTHER PUBLICATIONS

"Decentralized network connection preemption algorithms"; Peyravian & Kshemkalyani; *Computer Networks and ISDN Systems*; 1998; pp. 1029–1043.

"Joint Source/Channel Coding of Statistically Multiplexed Real–Time Services on Packet Networks"; Garrett et al.; *ACM Transactions on Networks, U.S.*, IEEE Inc., New York, vol. 1, No. 1, 1993, pp. 71–80.

"Integrated Services in the Internet Architecture: an Overview"; Braden et al.; *Network Working Group*; http://www.ietf.org/rfc/rfc1633.txt; Jun. 1994; pp. 1–31.

"Internet Protocol, Version 6 (IPv6) Specification"; Deering and Hinden, *Network Working Group*; http://afs.wu–wien-.ac.at/manuals/rfc/rfc1883.txt; Dec. 1995, pp. 1–35.

"Simple Integrated Media Access (SIMA)"; K. Kilkki; *Network Working Group Internet–Draft*; http://www–nrc.nokia-.com/sima>; Jun. 1997; pp. 1–21.

"Meeting the challenges of deploying the global broadband network infrastructure"; *1998 IEEE ATM Workshop Proceedings*; May 26–29, 1998; pps. 225–233.

"Charging and Billing Issues in High Speed Heterogeneous Networking Environments", Raffali–Schreinemachers et al., *Global Information Infrastructure (GNz) Evolution*, Jan. 10, 1996, pp. 97–108.

"Tariffs and effective bandwidths in multiservice networks", Kelly, *Teletraffic Science and Engineering*, vol. 1A, Jun. 6, 1994, pp. 401–410.

"Quality of Service Guarantees and Charging in Multiservice Networks", *IEICE Trans. Commun.*, vol. E81–B, No. 5, May 1998, pp. 824–831.

* cited by examiner

*Primary Examiner*—Kenneth N Vanderpuye
(74) *Attorney, Agent, or Firm*—Altera Law Group LLC

(57) ABSTRACT

A routing system and method adapted to a SIMA network routes packets of information from a start network node to a target network node. Each node in a SIMA network monitors the allowed priority level of every outgoing link. A monitor gives a route controller information about the allowed priority levels of at least a nodes outgoing links to all other nodes. The monitor may be used to deliver such information to buffers of other nodes. The monitor also may receive other nodes' allowed priority levels, and based on the allowed priority levels of all nodes, the route controller of each node delivers the information about the current allowed priority level of every link to all other network nodes. The start node calculates the total costs for all reasonable routes to the target node. The calculation takes into account the allowed priority levels and/or the preference value of the outgoing links, such as the length of the path. The route or link with the lowest total costs is selected.

10 Claims, 6 Drawing Sheets

USE ALLOWED PRIORITY LEVEL FOR ROUTING DECISION IN SIMA NETWORKS

RELATED PATENT APPLICATION

The present invention relates to U.S. patent application Ser. No. 09/159,005 entitled "USE OF PRIORITIES DEFINED BY A CUSTOMER IN A SIMA NETWORK", filed Sep. 23, 1998, and U.S. patent application Ser. No. 09/120,607 entitled "NBR POOL FOR SIMA NETWORK", filed Jul. 22, 1998, now U.S. Pat. No. 6,249,816, the subject matter of which is hereby incorporated by reference.

BACKGROUND OF THE INVENTION

1. Field of the Invention

This invention relates in general to communication systems, and more particularly, to a method and apparatus for managing information communicated over a network.

2. Description of Related Art

The state of communications technology, particularly that which affects the Internet, is currently in flux and subject to rapid and often uncoordinated growth. The ubiquity and diversity of personal computers and set-top boxes has placed significant pressure on the providers of communications system infrastructure to accommodate the alarming increase in the number of new users that demand immediate access to Internet and other network resources. The rapid development of new and sophisticated software made available to users of such services places additional demands on system infrastructure.

Conducting commerce over the Internet and other networks is a practice that is gaining acceptance and popularity. By way of example, traditional on-line services, such as those offered by Internet providers, typical charge customers a monthly fee for access to basic services and resources, such as proprietary and public databases of information. Such traditional service providers also advertise any number of products or services which are purchasable on-line by the user.

Other forms of Internet commercialization currently being considered or implemented include offering of video and audio conferencing services, and a variety of other real-time and non-real-time services. The providers of these services, as well as the providers of communications system infrastructure, are currently facing a number of complex issues, including management of network capacity, load, and traffic to support real-time, non-real-time, and high-bandwidth services, and implementing a viable billing scheme that accounts for the use of such services.

The communications industry is expending considerable attention and investment on one particular technology, referred to as asynchronous transfer mode (ATM), as a possible solution to current and anticipated infrastructure limitations. Those skilled in the art understand ATM to constitute a communications networking concept that, in theory, addresses many of the aforementioned concerns, such as by providing a capability to manage increases in network load, supporting both real-time and non-real-time applications, and offering, in certain circumstances, a guaranteed level of service quality.

Although the current ATM service architecture would appear to provide, at least at a conceptual level, viable solutions to the many problems facing the communications industry, ATM, as currently defined, requires implementation of a complex traffic management scheme in order meet the objectives articulated in the various ATM specifications and recommendations currently being considered. In order to effectively manage traffic flow in a network, conventional ATM traffic management schemes must assess a prodigious number of traffic condition indicators, including service class parameters, traffic parameters, quality of service parameters and the like. A non-exhaustive listing of such parameters and other ATM traffic management considerations is provided in ITU-T Recommendation 1.371, entitled Traffic Control and Congestion Control in B-ISDN, and in Traffic Management Specification, version 4.0 (af-tm-0056.000, April 1996), published by the Technical Committee of the ATM Forum.

Notwithstanding the complexity of conventional ATM traffic management schemes, current ATM specifications and recommendations fail to adequately address the need of service providers for a methodology that provides for accurate and reliable charging of services utilized by user's of the network. Even if one were to assume that a charging scheme that accounts for most or all of the currently defined ATM traffic management properties could be developed, such a scheme would necessarily be complex and would typically require administration by highly skilled operators. The high overhead and maintenance costs to support such a billing scheme would likely be passed on to the network provider and, ultimately, to the network user.

Some commentators have suggested that a solution to these problems may be found by increasing the bandwidth or capacity of the network (e.g., the Internet). Implementing this overly simplistic solution would require an appreciable investment of hardware, software, and, most likely, replacing existing communication lines with high bandwidth transmission lines, such as fiber optic lines. This suggested solution, however, would likely result in undisciplined network expansion and uncoordinated management of network traffic. Also, such a solution, if implemented, would appear to obviate the need for much of the sophisticated traffic management features currently defined in ATM specifications.

Accordingly, there is a need in the communications industry for a network management architecture and method that is simple in concept and in its implementation, yet adequately addresses the quality of service requirements to support a variety of network services, including real-time and non-real-time services. There exists a further need for a system and methodology that provides for the implementation of a simple and effective charging capability that accounts for the use of network services. The present invention fulfills these and other needs which remain unaddressed by prior art traffic management approaches.

The basic objectives of future Internet are to increase the network capacity, to offer a practical real-time service, and to develop a feasible charging scheme. These objectives introduce very strict requirements for the traffic control system. A Simple Integrated Media Access (SIMA) is recently introduced to present a new simple approach for traffic management. According to the SIMA concept, each customer shall define only two issues before a connection establishment: a nominal bit rate (NBR) and a selection between real-time and non-real-time service classes. NBR forms the basis of charging, and it defines how the network capacity is divided among different connections during overload situations. Simplicity of SIMA means that, on one hand, the network operator does not guarantee the continuous availability of nominal bit rate, and on the other hand, the user is allowed to send data with any bit rate independently of the NBR. As a result, the strength of SIMA lies in its wide area of applications. Accordingly, there is no need to build complex systems with several service classes each appropriate to only certain applications.

Generally, there are two main alternatives for the realization of the SIMA service: the first one based purely on packet network, and the second one based on the use of ATM for the switching and transportation. As the basic implementation of these two alternatives does not considerably differ from each other. The main difference is that the ATM makes possible to realize more easily a satisfactory real-time service. The implementation of the SIMA service includes two main parts: access nodes (A) and core network nodes (C) presented in FIG. 1. The traffic measurement of every flow of the network is performed at access nodes (A), whereas at the core network nodes (C), the traffic control functions do not need to know anything about the properties of separate flows. As shown in FIG. 1, one customer equipment (CE) is connected to another customer equipment (CE) through a SIMA network with access nodes (A).

When a network operator offers a SIMA service, a customer first pays for some Nominal Bit Rate (NBR, e.g. kbit/s) and then the customer can trade the speed for Quality of Service (QoS) for the transmission of its data packet. Specifically, the SIMA network, once receiving customer's NBR, measures actual bit rate of selected connection and determines a priority level (PL) of each data packet at the user/network interface (UTNI). Thereafter, the data packet is transmitted to the SIMA network (from an access node to a core network node) whereby the SIMA network determines the state of buffer(s) of the core network node so as to decide whether the core network node should accept or discard packet based on PL of the data packet and the state of buffer(s).

One principle of a SIMA network is that data packets are discarded only when necessary and not automatically on the network interface. The discarding decision is mainly based on two considerations: 1) the priority of the data packet; and 2) the allowed priority level (PL) in the buffer(s) of the particular core network node.

One of the concerns for the existing SIMA networks is that if the allowed priority level in the buffer(s) varies through the network at a certain moment, some data packets may be delivered through several network nodes, but then discarded near the end of the data packet transmitting path. This kind of behavior is not desired as it can significantly waste network resources.

Therefore, it can be seen that there is a need for a SIMA network to be equipped with a routing system that is able to equalize or substantially equalize the allowed priority levels as much as possible, or in other words, to transmit data packets in such a path that the probability of being discarded is the least.

It can also be seen that there is a need for a method and system for managing information communicated over a network, especially a SIMA network, as well as enhancing the ability of increasing the network capacity, offering a practical real-time service, and developing a feasible charging scheme.

SUMMARY OF THE INVENTION

To overcome the limitations in the prior art described above, and to overcome other limitations that will become apparent upon reading and understanding the present specification, the present invention is directed to a system and method for communicating elements of information over a network, and more particularly, to a system and method for managing information communicated over the network. The network includes access nodes which provide a user access to core network nodes. Each access node or core network node has a buffer with an allowed priority level for data transmission. Each node in network monitors the allowed priority level of every outgoing link. The monitoring device gives the routing device information about the allowed priority level. Each node delivers the information about the current allowed priority level of every link to all other nodes. The first node determines the total costs for all reasonable routes to the target node. The determination takes into account the allowed priority levels and/or the length of the data path or route. The route with the lowest total cost is selected. The selected route has the least probability for the data to be discarded among all the routes. Accordingly, the present invention makes possible the equalization of priority levels in SIMA network, as it preferably routes packets to those links that have the lowest allowed priority level.

The present invention provides a routing system for a SIMA network for transmitting packets of information. In one embodiment, the present invention includes: a first network node transmitting the packets of information; a second network node for receiving the packets of information transmitted from the first network node; at least two routes connected between the first and second network nodes, at least one of the routes having a third network node, the third network node having at least one outgoing link; and the first network node comprising: at least one outgoing link, the outgoing link being a part of one of the two routes; a route controller for transmitting the packets of information from the first network note to the second network node; a buffer, the buffer storing the packets of information and an allowed priority level for each of the outgoing links of the first and third network nodes, the packets of information being transmitted via one of the routes selected by the route controller; a monitor, the monitor coupled to the buffer and the route controller, the monitor monitoring the allowed priority level of each of the outgoing links of at least the first network node and informing at least the first and third nodes the allowed priority level of each of the outgoing links; and wherein the route controller selects one of the routes from the first network node to the second network node, based on the allowed priority levels of the outgoing links of at least the first and third network nodes.

One aspect of the embodiment is that the route controller selects one of the routes with a lowest cost determined by the allowed priority levels of at least the first and third network nodes.

In an alternative embodiment, the present invention includes: a first network node transmitting the packets of information; a second network node for receiving the packets of information transmitted from the first network node; and the first network node comprising: at least two outgoing links for transmitting the packets of information to the second network node, and each of the outgoing links having a predetermined preference value; a buffer, the buffer storing the packets of information and having an allowed priority level for each of the outgoing links, the packets of information being transmitted via one of the outgoing links selected by the route controller; and wherein the route controller selects one of the outgoing links based on the allowed priority level and the predetermined preference value of each of the outgoing links.

One aspect of the alternative embodiment is that the route controller determines a value difference between the allowed priority level and the predetermined preference value of each of the outgoing links and selects one of the outgoing links which has the largest value difference.

The present invention also provides a method of routing packets of information in a SIMA network from a first network node to a second network node, comprising the steps of: providing at least two routes connected between the first and second network nodes, at least one of the routes having a third network node, the first and third network nodes each having at least one outgoing link; monitoring an allowed priority level of at least the one outgoing link of the first network node, at least the one outgoing links being a part of the routes; informing the first and third network nodes the allowed priority level of each of the outgoing links; and selecting one of the routes from the first network node to the second network node based on the allowed priority levels of the outgoing links of at least the first and third network nodes.

One aspect of the method is that the selecting step selects one of the routes with a lowest cost determined by the allowed priority levels of at least the first and third network nodes.

The present invention further provides an alternative method of routing packets of information in a SIMA network from a first network node to a second network node, comprising the steps of: providing at least two outgoing links for the first network node, and each of the outgoing links having a predetermined preference value; monitoring an allowed priority level of each of outgoing links; and selecting one of the outgoing links to transmit the packets of information from the first network node to the second network node based on the allowed priority levels and the predetermined preference value of the outgoing links.

One aspect of the alternative method is that the selecting step includes determining a value difference between the allowed priority level and the predetermined preference value of each of the outgoing links, and selecting one of the routes which has the biggest value difference.

One of the basic ideas of the present invention is to use information of the allowed priority levels at network nodes for data packet routing.

Other embodiments of a system in accordance with the principles of the invention may include alternative or optional additional aspects. One such aspect of the present invention is that other appropriate selecting methods can be used to determine which route should be taken It will be appreciated that other equivalent alternative embodiments of can be used without departure of the present invention.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
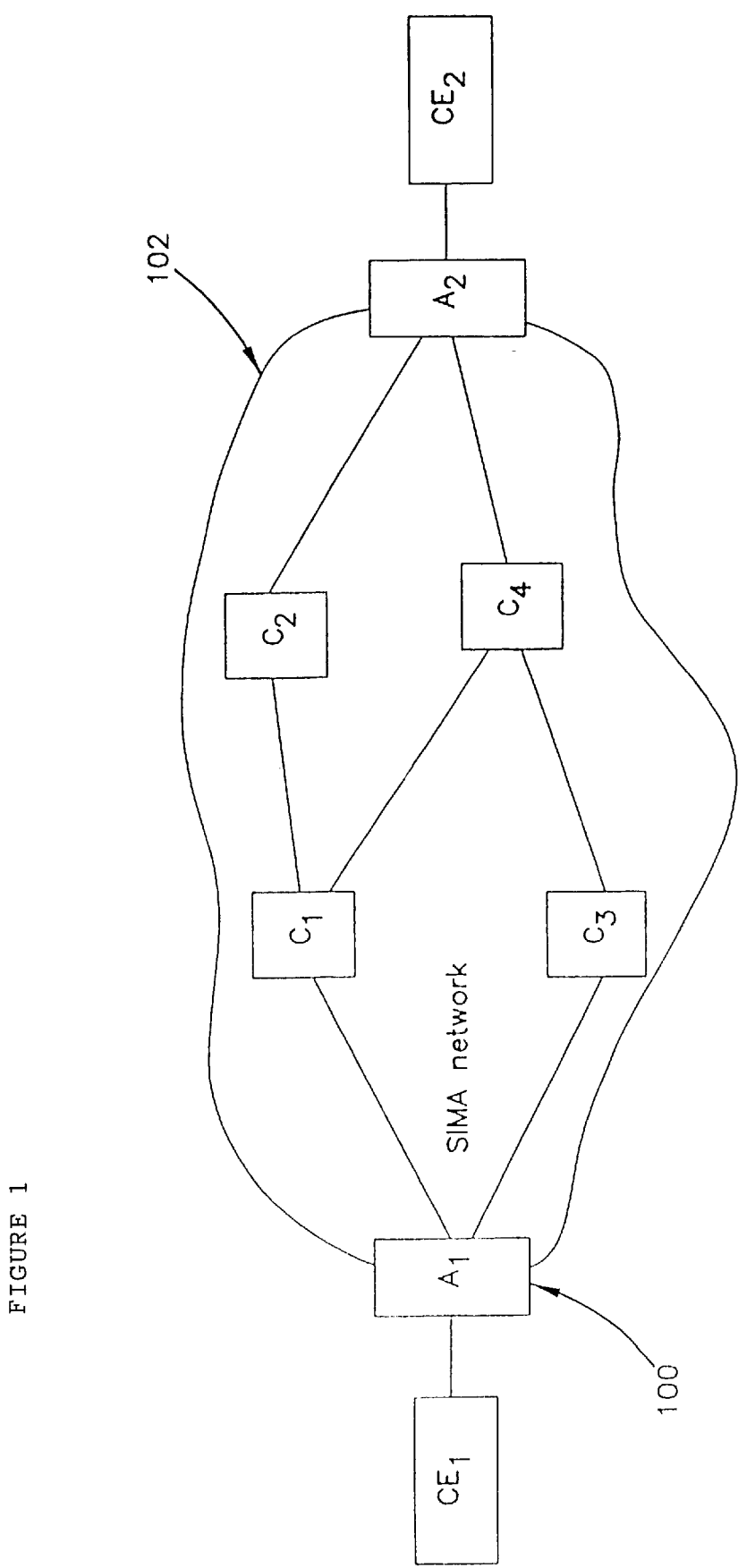
FIG. 1 illustrates network nodes used in communication from one customer to the other in a SIMA network in which a routing system of the present invention can be adapted.

In FIG. 1, a routing system 100 in accordance with the present invention is adapted to a SIMA (Simple Integrated Media Access) network 102. It is appreciated that the routing system 100 can also be adapted to or equipped with other networks, such as a conventional IP (Internet Protocol) or ATM network, etc.

When a consumer or consumer equipment (CE1) sends packets of information to another consumer or consumer equipment (CE2), consumer CE1 accesses a network at node A1 (the starting network node). There are several routes, for examples, A1C1C2, A1C1C4, A1C3C4, etc., to reach node A2 accessible by consumer CE2. Each node has at least one outgoing links. For example, node A1 has two outgoing links, whereas C3 has one outgoing link. In one embodiment, all links are bidirectional, that is, packets of information can be conveyed in both directions such that depending on actual traffic load, a suitable route, e.g. sometimes even a longer route, e.g. A1C3C4C1C2A2, may be chosen.

Each node's outgoing link has a priority level so as to determine whether the packets of information or packets should be transmitted or discarded. The priority level of the outgoing link is changeable time to time due to the increase or decrease of load of information on the outgoing link. When the load of information becomes heavier on an outgoing link, the corresponding priority level is higher such that less packets of information are able to qualify the high priority level. Accordingly, more packets are discarded. When the load of information becomes lighter on an outgoing link, the corresponding priority level is lower such that more packets of information are able to qualify the low priority level. Accordingly, less packets are discarded.

A SIMA network is designed to only discard packets when necessary, but not automatically on the network interface. The discarding decision is mainly based on two issues: the priority of the packet and the allowed priority level in a buffer or buffering unit under consideration at the network nodes. As later shown in FIGS. 3 and 5, each network node has a buffer which stores the inputted packets of information and priority levels of outgoing links of the node. The buffer of each network node may also store preference values of its outgoing links and the other network nodes' priority levels.

One potential problem of SIMA network stated before is that if the allowed priority level at a certain moment varies through the network, some packets may be delivered through several nodes but then discarded near the end of the path, which wastes network resource. The routing system 100 of the present invention selects a route having the lowest allowed priority level and delivers packets of information from one starting network node to a target node via the selected route. Since the routing system chooses a route having the lowest allowed priority level, the packets would have least chance to be discarded compared to other routes. Accordingly, the routing system 100 equalizes the allowed priority levels as much as possible.

Figure 2:
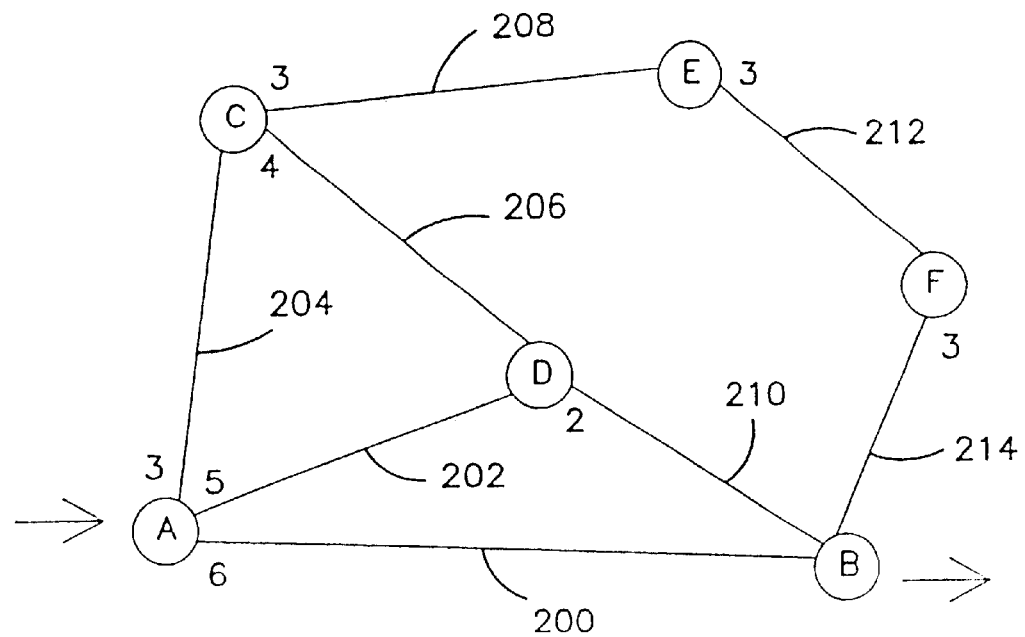
FIG. 2 illustrates an allowed priority level of each outgoing link of some of the network nodes of a SIMA network.

The routing system 100 utilizes information of allowed priority levels for packet routing. Two exemplary approaches are described below. In FIG. 2, the network is used to deliver packets from node A to node B. Node A has three outgoing links 200, 202, 204. Node C has two outgoing links 206, 208. Node D has one outgoing link 210. Node E has one outgoing link 212. Node F has one outgoing link 214. There are four routes from Node A to Node B: AB, ADB, ACDB, ACEFB.

Figure 3:
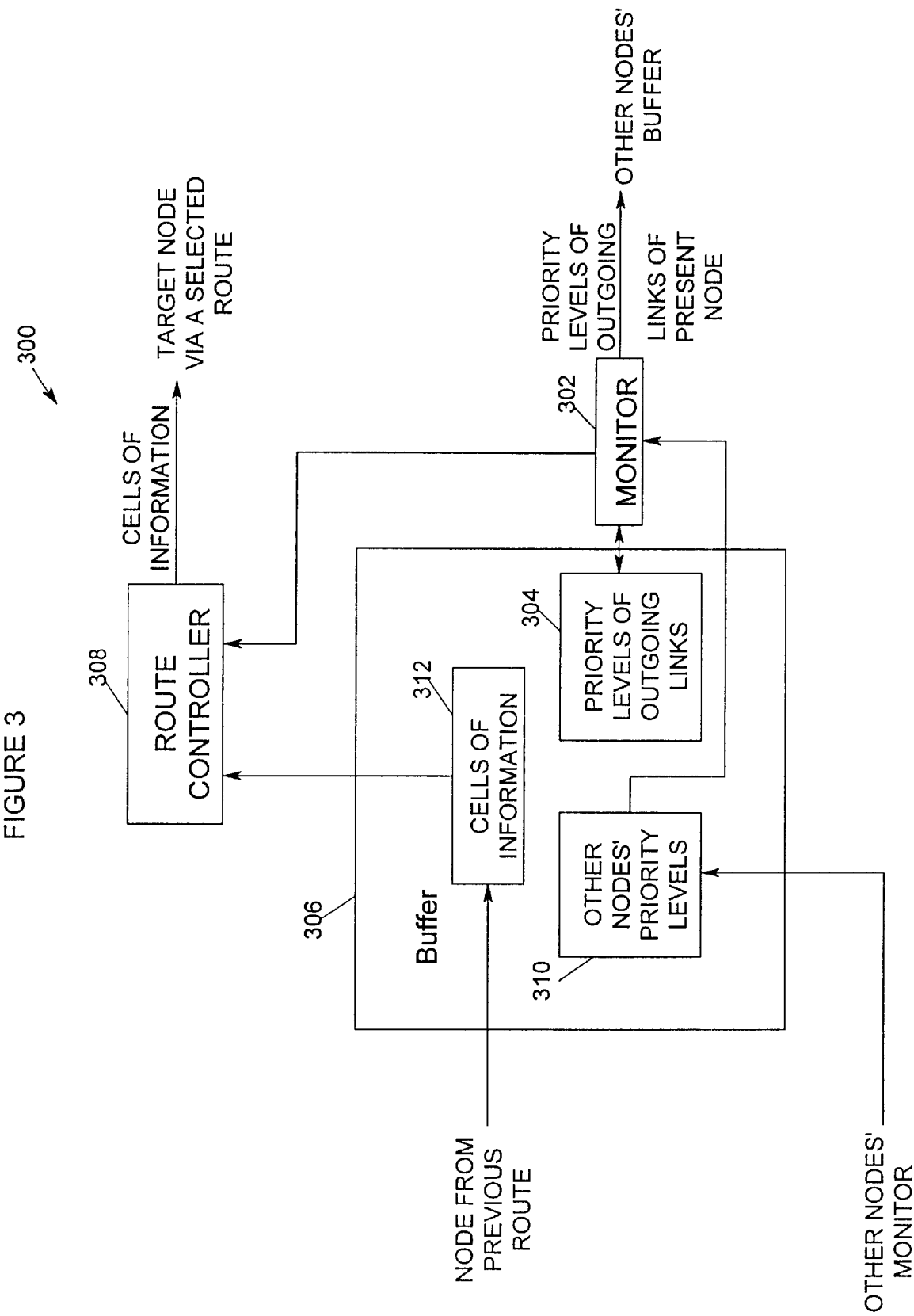
FIG. 3 is a block diagram of a routing system adapted for a SIMA system according to the present invention.

In the first exemplary approach, the routing system disseminates state information of the allowed priority levels to all nodes belonging to a network (or sub-network). FIG. 3 illustrates a block diagram of a routing system 300 in the first exemplary approach adapted for a SIMA system in according to the present invention. Each node includes a monitor 302 monitoring the allowed priority level of every outgoing link 304 which are stored in a buffer 306. This information is generally related to an average value over a relatively long period, for instances, 15 or 30 minutes, to avoid an unstable behavior.

The route system 300 also includes a route controller 308. The monitor 302 provides the route controller 308 information about the allowed priority level of the node. The information may include the average value, the maximum value, or some combination of them, etc.

Each node also delivers its current allowed priority levels of its outgoing links to all other nodes. In one embodiment, the monitor 302 delivers such information to buffers of other nodes. It will be appreciated that other methods of providing such information to buffers of other nodes can be used. For example, a separate read device can be used to directly read the priority levels of outgoing links 304 of the buffer 306 without departure from the principles of the present invention.

Accordingly, applying the first exemplary to FIG. 2, the allowed priority levels of each outgoing links of nodes are labeled at the beginning of the links. The labeled allowed priority levels are merely for illustration and explanation purposes. It is appreciated that many other combinations of priority levels (0–7 in SIMA network or other level ranges in other network systems) can be used without departure from the scope of the invention. For instance, the allowed priority level on link CE 208 is 3.

The monitor 302 also receives other nodes' allowed priority levels 310 stored in the buffer 306. Based on the allowed priority levels of the outgoing links of the all nodes, the route controller 308 determines a route with the lowest allowed priority level and delivers packets of information 312 stored in the buffer 306 to the target node, e.g. Node B, via the selected route. Alternatively, other nodes' allowed priority levels 310 can be directly sent to the route controller 308. It is appreciated that the route controller 308 can read the allowed priority levels of other nodes and the local node via other reading means.

At node A, the route controller 308 calculates the total "costs" for all reasonable routes from node A to the target node B. The calculation takes into account the allowed priority levels. The following formula can be applied:

$$R(k) = \Sigma PL(i)^\alpha$$

where PL(i) is the allowed priority level of the ith link on route k, and $\alpha$ is a constant which is defined or predefined by a network operator, e.g. 0, 1.5, 3, 4, etc. The network operator can define the constant according to the setting or state of the network.

The route with the lowest total "cost" R(k) is selected by the route controller 308. The selection depends on the value of $\alpha$. If $\alpha$ is 0, the shortest path (the smallest number of hops) is selected, whereas if $\alpha$ is large, the selection is mainly based on the highest PL(i) value of each route. It can be seen from the following Table 1 that the total costs for different routes from nodes A to B depend on the value of $\alpha$ and the allowed priority levels of the outgoing links, and that a different route is selected:

| Route | $\alpha = 0$ | $\alpha = 1.5$ | $\alpha = 3$ | $\alpha = 4$ |
|-------|--------------|----------------|--------------|--------------|
| AB    | 1            | 14.7           | 216          | 1296         |
| ADB   | 2            | 14.0           | 133          | 641          |
| ACDB  | 3            | 16.0           | 99           | 353          |
| ACEFB | 4            | 20.8           | 108          | 324          |

The bolded numbers are the lowest total "costs" which correspond to the route with the lowest allowed priority levels. For instance, when $\alpha$ is 1.5, the route controller 308 selects route ADB. The examples shown in Table 1 is merely for illustration and explanation purposes. When $\alpha$ is 0, the shortest path AB is the selected route.

Figure 4:
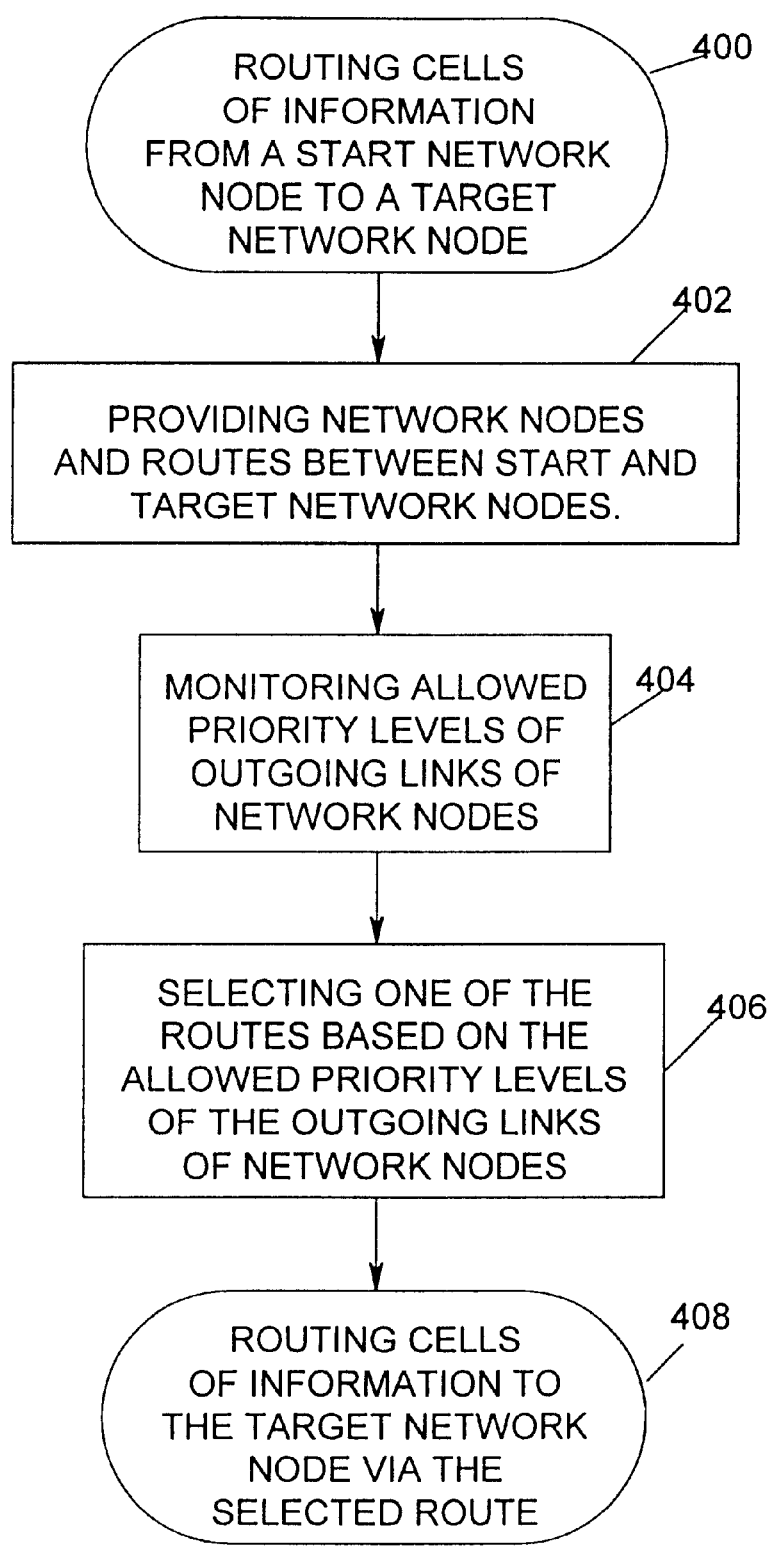
FIG. 4 is a flow chat of a routing operation according to the present invention.

FIG. 4 is a flow chat of a routing operation according to the present invention. The operation routes packets of information from a start network node to a target network node as shown in box 400. From the start network node to the target network node, other network nodes may be linked such that different routes A. between the start and the target nodes are provided in box 402. The allowed priority levels of outgoing links of the network nodes are monitored in box 404. One of the routes based on the allowed priority levels of the outgoing links is selected in box 406. Finally, the packets of information are routed from the start network node to the target network node via the selected route in box 408. It will be appreciated that the flow chart provides a summary of the basic operation. It is merely for an illustration purpose, not for a limitation purpose to the scope of the invention.

Figure 5:
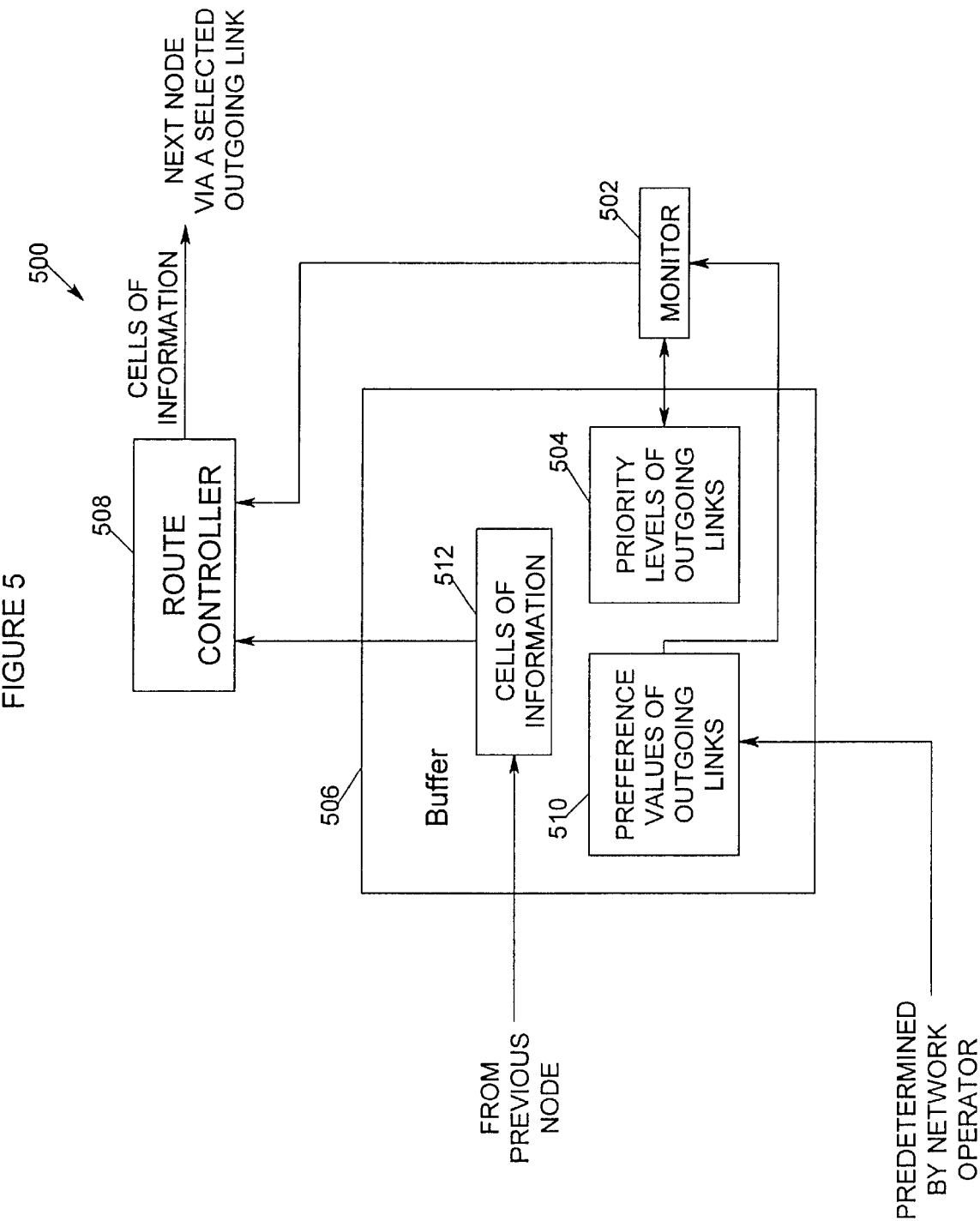
FIG. 5 is a block diagram of an alternative route system adapted for a SIMA system in according to the present invention.

In the second exemplary approach, the routing system determines a route based purely on local information about the allowed priority levels, i.e. the local network node, such as the start network node. The local information about the allowed priority levels does not have to be disseminated to all other nodes belonging to a network (or sub-network). FIG. 5 illustrates a block diagram of a routing system 500 in the second exemplary approach adapted for a SIMA system in according to the present invention. Each node includes a monitor 502 monitoring the allowed priority level of every outgoing link 504 which are stored in a buffer 506. Similarly, this information about the allowed priority levels is generally related to an average value over a relatively long period, for instances, 15 or 30 minutes, to avoid an unstable behavior. In addition, the monitor 502 also receives preference values 510 of outgoing links of the local network node stored in the buffer 506. The preference values of each outgoing links are defined or predefined by the network operator., e.g. 10, 9, 9.5, 8, 7, 6, etc. The network operator can define the preference values according to the setting or state of the network. Alternatively, the preference values 510 can be directly sent to the route controller 508. It is appreciated that the route controller 508 can read the preference values and allowed priority levels of outgoing links via other reading means.

Accordingly, applying the first exemplary to FIG. 2, the allowed priority levels of each outgoing links of nodes are still labeled at the beginning of the links. The labeled allowed priority levels are merely for illustration and explanation purposes. It is appreciated that many other combinations of priority levels (0–7 in SIMA network or other level ranges in other network systems) can be used without departure from the scope of the invention. For instance, the allowed priority level on link CE 208 is 3.

The allowed priority level for an outgoing link AD is PL(AD) which is 5. Each node may keep a list for every target address about the possible outgoing links. With conventional routing protocols, the order is usually based on the length of route, and the shortest path is the first choice. In the case of SIMA network, each outgoing link has a preference value P. For instance, the outgoing link AD has a preference value P(AD). Based on the allowed priority levels of the outgoing links of the local network node, e.g. node A, the route controller 508 determines an outgoing link and delivers packets of information 512 stored in the buffer 506 to the next network node via the selected outgoing link.

At node A, the route controller 508, based on both the preference value P and the allowed priority level of each outgoing link, selects an outgoing link with the largest P-PL, e.g. P(AD)-PL(AD). Given the same preference value of the outgoing link, the lower the allowed priority level, the larger the difference between the two values is. Further, given the same allowed priority level, the larger the preference value of the outgoing link is, the larger the difference between the two values is. The larger the difference between the two values is, the lower the total "costs" for delivering on that link. It can be seen from the following Table 2 that the total costs for different outgoing links of node A depend on the preference value and the allowed priority level of the outgoing link:

| P(AB)       | 10 | 10  | 10 |
| P(AD)       | 9  | 9.5 | 8  |
| P(AC)       | 8  | 7   | 6  |
| P(AB)-PL(AB)| 4  | 4   | 4  |
| P(AD)-PL(AD)| 4  | 4.5 | 3  |
| P(AC)-PL(AC)| 5  | 4   | 3  |

The bolded numbers are the lowest total "costs" which correspond to the selected link. For instance, among three outgoing links, when the preference values of AB, AD, and AC are 10, 9.5, and 7, respectively, link AD is selected because the difference of the two values of link AD is 4.5, whereas the other two links have a difference of 4. Once again, the examples shown in Table 2 is merely for illustration and explanation purposes.

Figure 6:
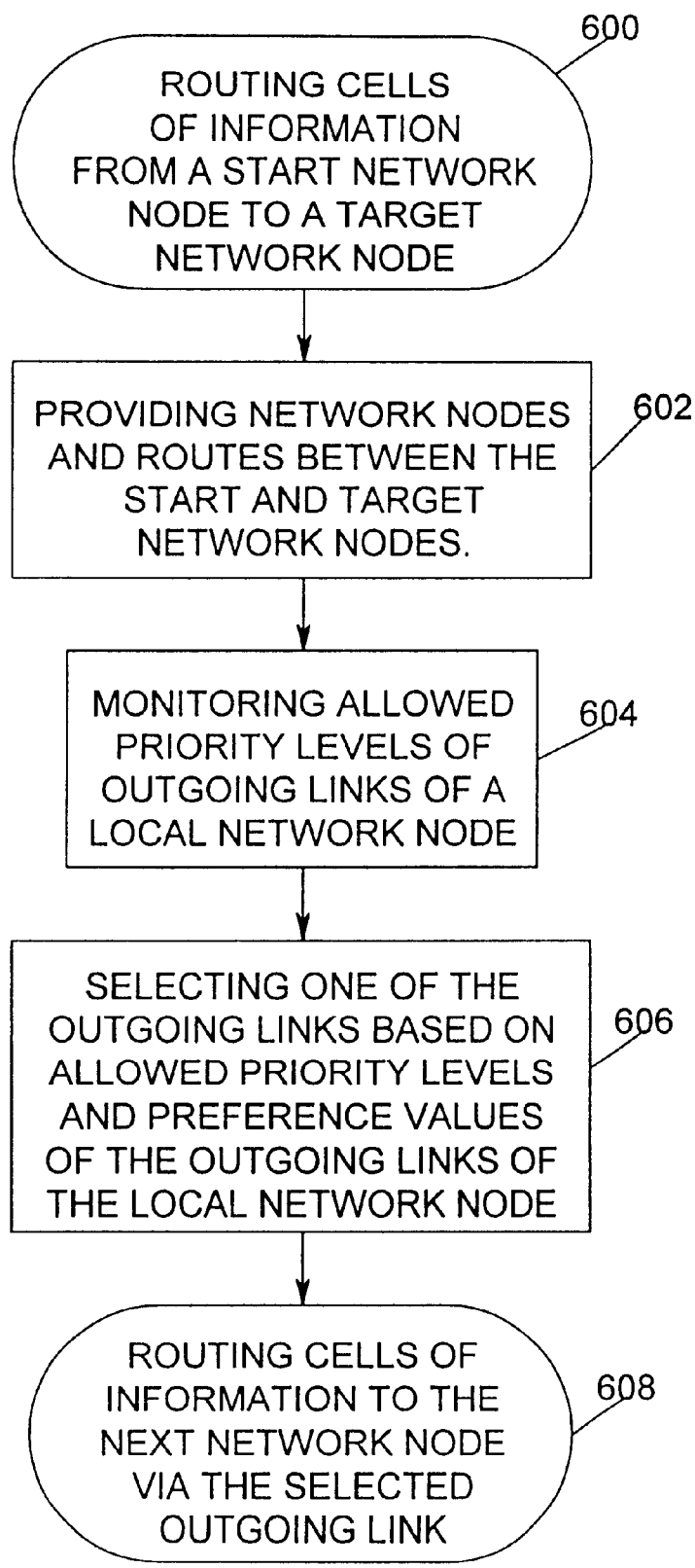
FIG. 6 is a flow chat of an alternative routing operation according to the present invention.

FIG. 6 is a flow chat of an alternative routing operation according to the present invention. The operation routes packets of information from a start network node to a target network node as shown in box 600. From the start network node to the target network node, other network nodes may be linked such that different routes between the start and the target nodes are provided in box 602. The allowed priority levels of outgoing links of the local network node, such as the start node, are monitored in box 604. One of the outgoing links of the local network node, such as the start node, is selected based on the allowed priority level and preference value of the outgoing links of the local network node in box 606. Finally, the packets of information are routed from the start network node to the next network node via the selected link in box 608. It will be appreciated that the flow chart provides a summary of the basic operation. It is merely for an illustration purpose, not for a limitation purpose to the scope of the invention.

It is appreciated that the routing system of the present invention makes possible the equalization of priority levels, at least to some degree, as it preferably routes packets to those links that have the lowest allowed priority level. As the load of these links increases, the allowed priority level increases as well. Provided with equalized allowed priority levels in the present invention, the SIMA network can avoid useless transmission of packets of information.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A routing system for a SIMA network for transmitting packets of information, comprising:

a first network node transmitting the packets of information;

a second network node for receiving the packets of information transmitted from the first network node;

at least two routes connected between the first and second network nodes, at least one of the routes having a third network node, the third network node having at least one outgoing link; and the first network node comprising:

at least one outgoing link, the outgoing link being a part of one of the two routes;

a route controller for transmitting the packets of information from the first network node to the second network node;

a buffer, the buffer storing the packets of information and an allowed priority level for each of the outgoing links of the first and third network nodes, the packets of information being transmitted via one of the routes selected by the route controller;

a monitor, the monitor coupled to the buffer and the route controller, the monitor monitoring the allowed priority level of each of the outgoing links of at least the first network node and informing at least the first and third nodes the allowed priority level of each of the outgoing links; and wherein the route controller selects one of the routes from the first network node to the second network node, based on the allowed priority levels of the outgoing links of at least the first and third network nodes.

2. The routing system of claim 1, wherein the route controller selects one of the routes with a lowest cost determined by the allowed priority levels of at least the first and third network nodes.

3. The routing system of claim 1, wherein the outgoing link is bidirectional.

4. A routing system for a SIMA network for transmitting packets of information, comprising:

a first network node transmitting the packets of information; a second network node for receiving the packets of information transmitted from the first network node; and the first network node comprising:

at least two outgoing links for transmitting the packets of information to the second network node, and each of the outgoing links having a predetermined preference value;

a buffer, the buffer storing the packets of information and having an allowed priority level for each of the outgoing links, the packets of information being transmitted via one of the outgoing links selected by a route controller;

a monitor coupled to the buffer and the route controller for monitoring the allowed priority level of each of the outgoing links of at least the first and second network nodes, and to provide information about the allowed priority levels of at least the first network node to at least the route controller and the second network node; and wherein the route controller selects one of the outgoing links based on the allowed priority level and the predetermined preference value of each of the outgoing links.

5. The routing system of claim 4, wherein the route controller determines a value difference between the allowed priority level and the predetermined preference value of each of the outgoing links and selects one of the outgoing links which has the largest value difference.

6. The routing system of claim 4, wherein the outgoing link is bi-directional.

7. A method of routing packets of information in a SIMA network from a first network node to a second network node, comprising the steps of:

providing at least two routes connected between the first and second network nodes, at least one of the routes having a third network node, the first and third network nodes each having at least one outgoing link;

monitoring an allowed priority level of at least the one outgoing link of the first network node, at least the one outgoing links being a part of the routes;

informing the first and third network nodes the allowed priority level of each of the outgoing links; and selecting one of the routes from the first network node to the second network node based on the allowed priority levels of the outgoing links of at least the first and third network nodes.

8. The method of claim 7, wherein the selecting step selects one of the routes with a lowest cost determined by the allowed priority levels of at least the first and third network nodes.

9. A method of routing packets of information in a SIMA network from a first network node to a second network node, comprising:

providing at least two outgoing links for a first network node, and each of the outgoing links having a predetermined preference value;

monitoring an allowed priority level of each of the outgoing links of at least the first network node and the second network node; and selecting one of the outgoing links to transmit the packets of information from the first network node to the second network node based on the allowed priority levels of at least the first network and second network nodes and the predetermined preference value of the outgoing links.

10. The method of claim 9, wherein the selecting step includes determining a value difference between the allowed priority level and the predetermined preference value of each of the outgoing links, and selecting one of the outgoing links which has the largest value difference.

* * * * *